United States Patent

Geurts

[15] 3,642,073
[45] Feb. 15, 1972

[54] SEMIMOUNTED PLOW AND COLTER

[72] Inventor: Cletus J. Geurts, 530 North Melvin, Gibson City, Ill. 60936

[22] Filed: Sept. 7, 1967

[21] Appl. No.: 666,047

Related U.S. Application Data

[63] Continuation-in-part of Ser. No. 486,712, Sept. 13, 1965.

[52] U.S. Cl. ............................172/140, 172/180, 172/196
[51] Int. Cl. ..........................................A01b 49/02, A01b 5/04
[58] Field of Search................172/140, 180, 181, 195, 196, 172/261, 264, 265, 144, 165, 166, 269, 270, 551, 748

[56] References Cited

UNITED STATES PATENTS

| | | | |
|---|---|---|---|
| 2,969,119 | 1/1961 | Barry | 172/2 |
| 3,032,122 | 5/1962 | Geurts | 172/264 |
| 3,061,018 | 10/1962 | Olson | 172/139 |
| 3,161,163 | 12/1964 | Cosner et al. | 111/3 |
| 3,416,611 | 12/1968 | Fischer | 172/261 |
| 3,349,855 | 10/1967 | Knudson | 172/261 |

*Primary Examiner*—Clyde I. Coughenour
*Attorney*—Burd, Braddock & Bartz

[57] ABSTRACT

A semimounted moldboard plow connected to the draft links of a tractor by a hitch having longitudinal, upright and transverse pivotal movements with respect to the frame of the plow. The hitch is connected to a tailwheel of the plow so that the wheel turns in the direction of movement of the tractor. Each plow bottom of the plow is held in the ground working position by a hydraulic holding, release and return mechanism. Fluidly coupled with the hydraulic mechanism of each plow bottom is a fluid cylinder which yieldably holds a colter in ground-working position.

7 Claims, 6 Drawing Figures

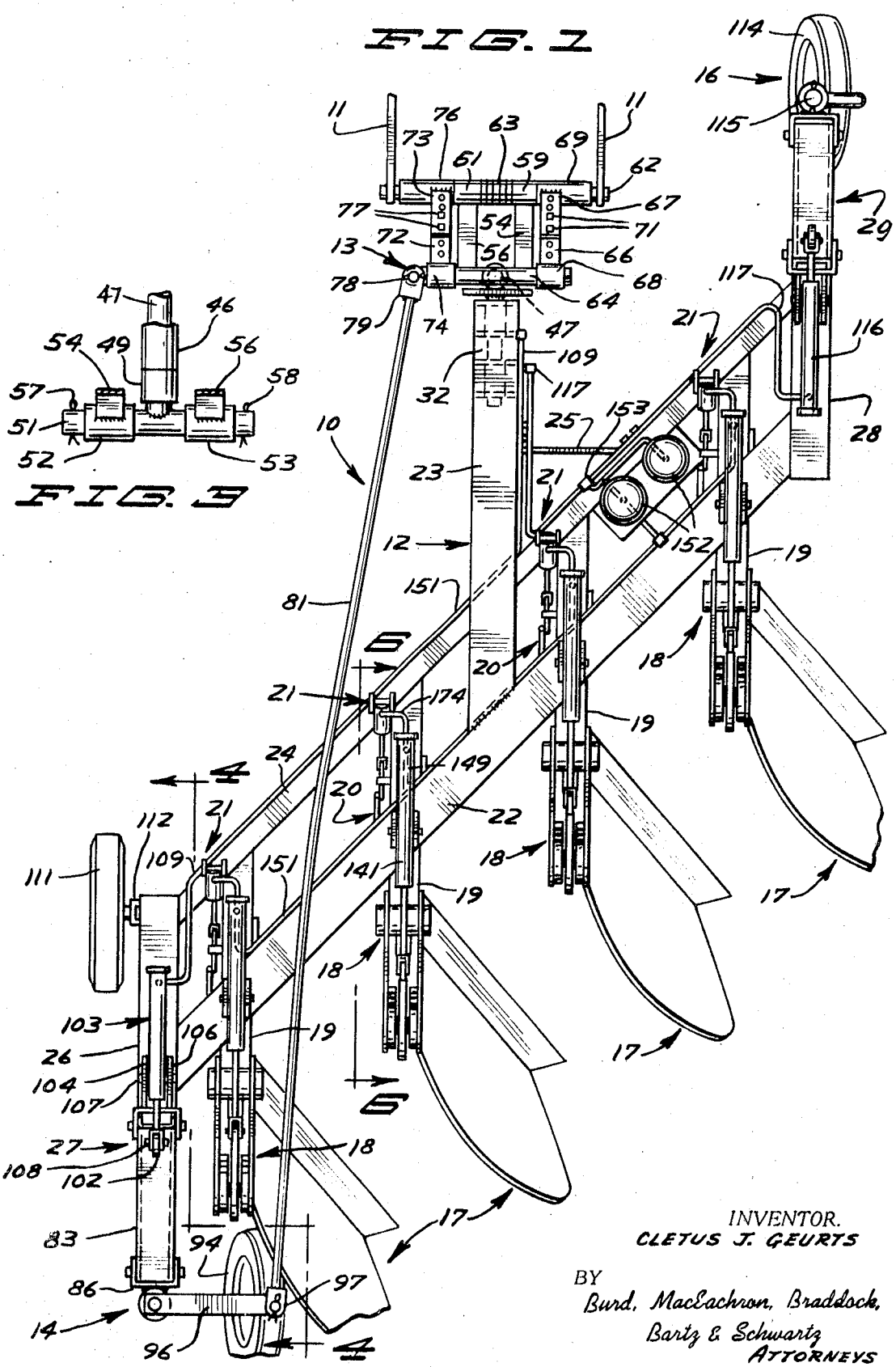

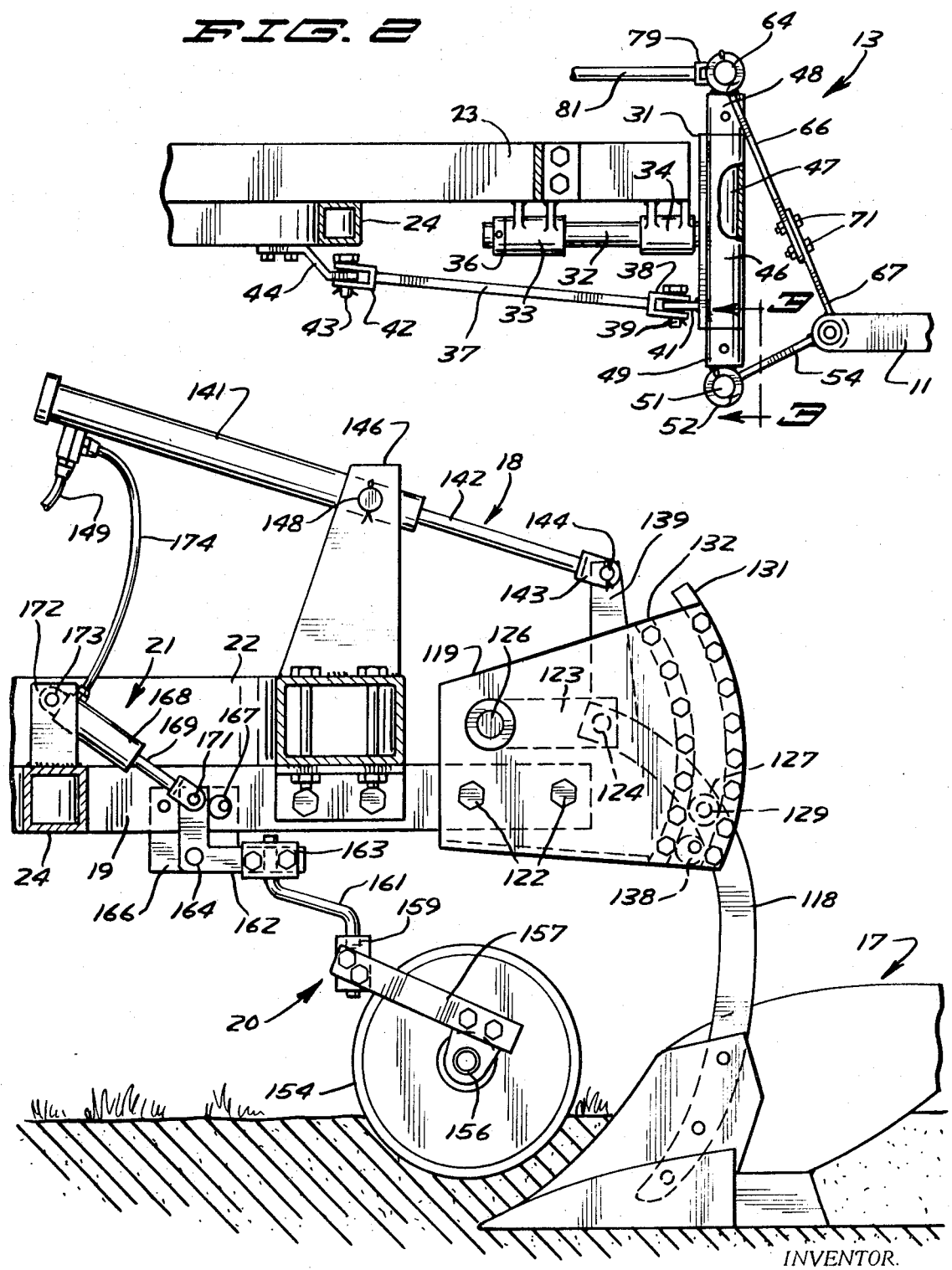

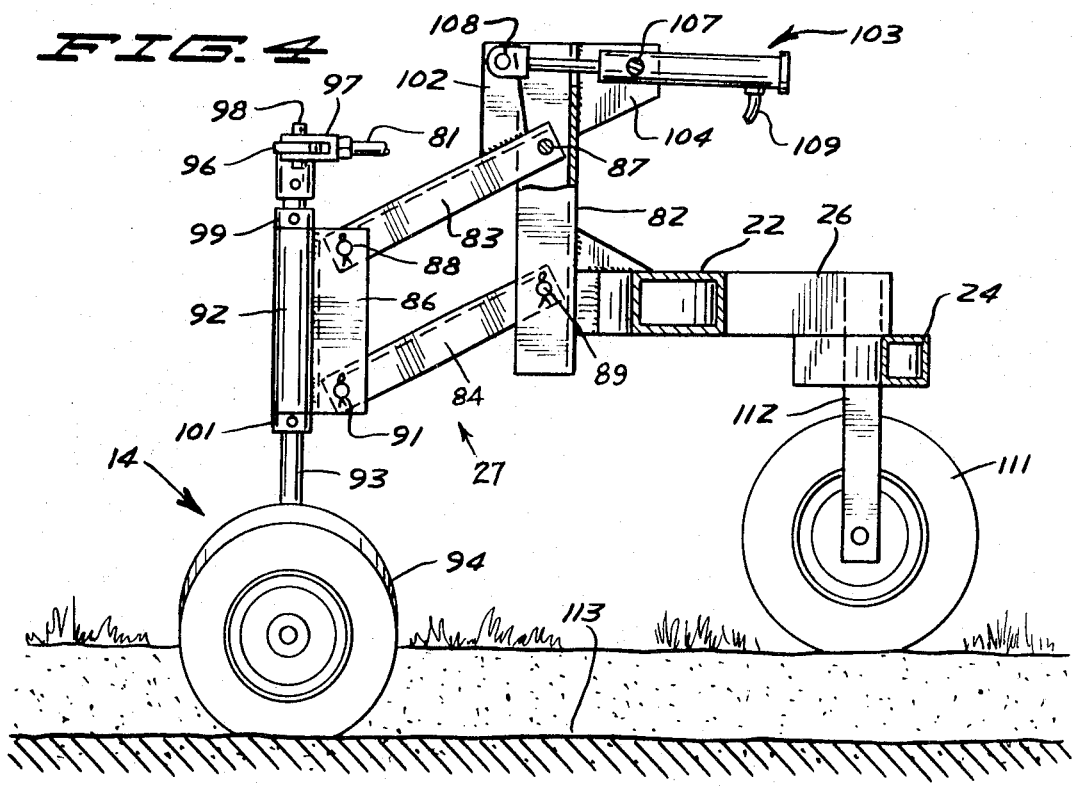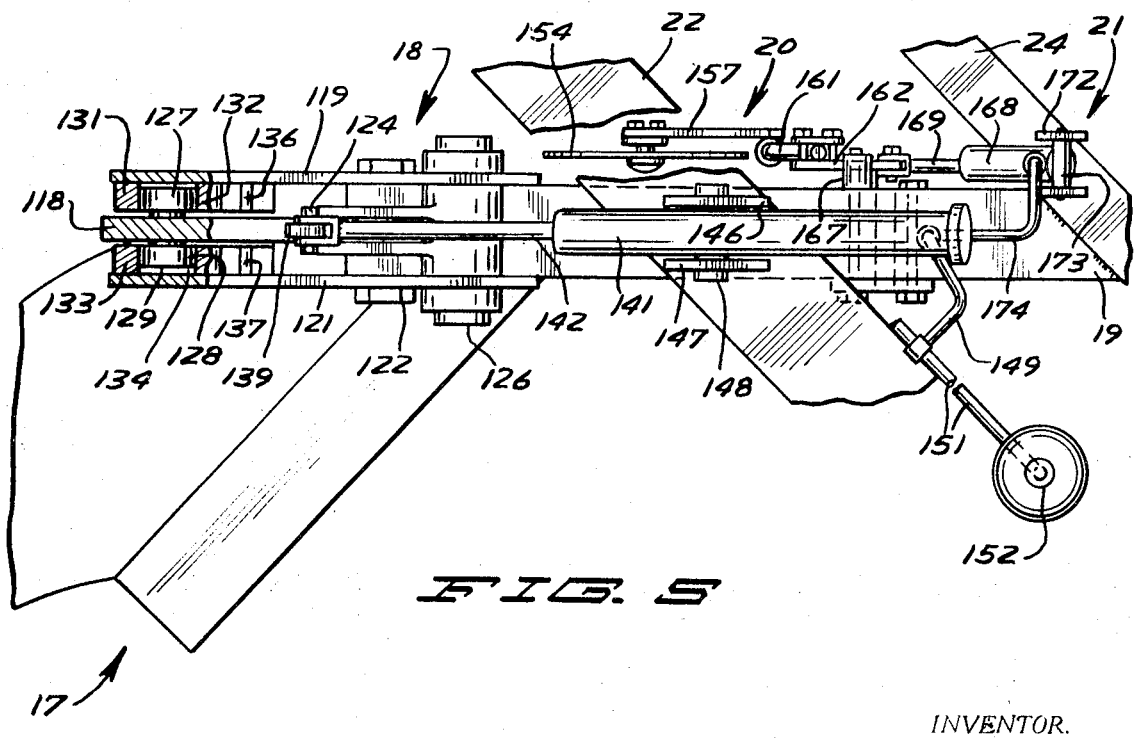

SEMIMOUNTED PLOW AND COLTER

This application is a continuation-in-part of U.S. application, Ser. No. 486,712, filed, Sept. 13, 1965.

BACKGROUND OF INVENTION

Semimounted plows having tailwheels steering hitches have been developed to turn the plows with the towing tractors. An example of a plow with a tailwheel steering hitch is shown in U.S. Pat. No. 3,228,484. A number of plows have also been equipped with trip release mechanisms for the plow bottoms and spring cushions for the colters. The U.S. Pat. to Geurts No. 3,032,122 is a combined mechanical and hydraulic pressure trip release for a plow bottom. In applicant's copending application Ser. No. 486,712 a completely hydraulic system is used to hold, to release and to return the plow bottom to the earth-working position. The present invention is a complete semimounted plow having a tailwheel steering hitch, a hydraulic system to hold, release and return both the plow bottoms and colters to ground-working positions, and independent hydraulic cylinders to raise and lower opposite ends of the plow.

SUMMARY OF INVENTION

One feature of the invention relates to an earth-working implement equipped with a pivoting hitch connected to a wheel for steering the wheel. The hitch is free to pivot in longitudinal, upright and transverse directions so that both the tractor and implement can pitch, roll and turn without altering the effectiveness of the implement. A separate hydraulic cylinder attached to support links for the wheel is used to raise and lower the implement frame.

Another feature of the invention is a fluid pressure system for holding, releasing and returning a colter to a ground-working position. This fluid pressure system can be combined with a fluid pressure mechanism for holding, releasing, and returning plow bottoms to ground-working positions.

IN THE DRAWINGS

FIG. 1 is a plan view of the semimounted plow of the invention;

FIG. 2 is an enlarged side view of hitch of the plow of FIG. 1;

FIG. 3 is a sectional view taken along the line 3—3 of FIG. 2;

FIG. 4 is an enlarged sectional view taken along the line 4—4 of FIG. 1;

FIG. 5 is an enlarged plan view of the hydraulic holding, release and return system for the plow bottom with parts broken away to show the hydraulic holding and release assembly for the colter; and FIG. 6 is an enlarged sectional view taken along the line 6—6 of FIG. 1.

Referring to the drawings there is shown in FIG. 1, a semimounted plow indicated generally at 10 connected to draft arms 11 of a conventional three-point hitch on a tractor. Plow 10 has a frame 12 pivotally connected to a steering hitch 13. A tailwheel assembly indicated generally at 14 mounted on the rear portion of the frame is connected in a steering relation with hitch 13. The opposite end of the frame is attached to a furrow wheel assembly 16. Between the tailwheel assembly 14 and furrow wheel assembly 16 a plurality of moldboard plow bottoms indicated generally at 17 are attached to the frame by separate hydraulic holding, release and return mechanisms indicated generally at 18. Each mechanism 18 is connected to a longitudinal draft beam 19 secured to the frame. Associated with each draft beam 19 is a rotating disc colter 20 and a hydraulic holding, release and return assembly 21 for biasing the colter in the ground-working position.

Frame 12 comprises an oblique main beam 22 and a forwardly projected hitch bar 23. Beam 22 may be of box-shape or tubular construction. The draft beams 19 secured to the bottom side of main beam 22 have portions that extend in a forwardly direction. The hitch bar 23 is secured to the midportion of beam 22. A second oblique beam 24 secured to the forward ends of draft beams 19 and the underside of hitch bar 23 provides lateral stability and reinforcement for the draft beams as well as the hitch bar. A brace 25 connects one side of hitch bar 23 with beam 24. Secured to the rear ends of beams 22 and 24 is a longitudinal end beam 26 carrying a lift unit indicated generally at 27 for tailwheel assembly 14. The opposite or forward ends of beams 22 and 24 are connected to a longitudinal front end beam 28 carrying a lift unit indicated generally at 29 for furrow wheel assembly 16.

Referring to FIG. 2, hitch 13 has an upright plate 31 located adjacent the forward end of hitch bar 23. Secured to the midportion of the back of plate 31 is a longitudinal shaft 32 telescoped through sleeve bearings 33 and 34. Bearings 33 and 34 are secured to the bottom side of the forward end of hitch bar 23. A collar 36 mounted on the end of shaft 32 holds the shaft in assembled relation with the sleeves 33 and 34 allowing the hitch to rotate about a horizontal axis extended in the direction of the hitch bar 23. Located below shaft 32 is a rearwardly extended pivoted link 37 having a clevice 38 at its forward end. An upright pin 39 projected through suitable holes in clevice 38 and a tab 41 secured to the bottom of plate 31 pivotally connects the forward end of link 37 to the plate 31. A similar clevice 42 is secured to the opposite end of link 37. An upright pin 43 connects clevice 42 with an offset bracket 44 attached to the bottom of beam 24. Link 37 stabilizes the plate 31, reduces the force on shaft 32 and allows limited rotation of the plate about the axis of shaft 32.

Secured to the front face of plate 31 is an upright tubular member or sleeve 46 carrying an upright shaft 47. A top collar 48 and a bottom collar 49 secured to opposite ends of shaft 47 maintain the shaft in assembled relation with tubular member 46. Attached to the bottom of shaft 47 is bottom transverse crossbar 51. As shown in FIG. 3, the ends of crossbar 51 pivotally carry cylindrical members 52 and 53 attached to links 54 and 56. Retaining members 57 and 58, as cotter pins, maintain the cylindrical members on bar 51. Returning to FIG. 1, the opposite ends of links 54 and 56 are secured to cylindrical members 59 and 61 rotatably mounted on a transverse draft bar 62. A plurality of spacers 63 on the midsection of bar 62 maintain the cylindrical members 59 and 61 in a spaced relationship on bar 62. The ends of the bar 62 are carried in the hooks or pockets in the ends of the draft arms to allow the hitch to have transverse horizontal rotational movement with respect to the draft arms.

Secured to the top of shaft 47 is a top crossbar 64 extended transversely in the same plane as bottom crossbar 51. Top crossbar 64 is connected to the transverse draft bar 62 by a pair of adjustable link members 66, 67 and 72, 73. As shown in FIG. 1, an upper plate 66 secured to a sleeve 68 rotatably mounted on one end of top crossbar 64 is aligned with a lower plate 67 secured to a sleeve 69 rotatably carried on the draft bar 62. A plurality of fastening means 71, as nut and bolt assemblies, projected through a pair of a plurality of holes in the plates 66 and 67 secure the plates together forming an adjustable link. Similar plates 72 and 73 secured to sleeves 74 and 76 connect the draft bar 62 with the top bar 64. Fastening means 77 adjustably secure plates 72 and 73 together. The link members are adjustable in length to change the elevation of the draft bar thereby adjusting the line of draft of the hitch. One end of crossbar 64 carries an upright pin 78 used to pivotally mount a clevice 79 attached to a rearwardly extended steering rod 81 for the tailwheel assembly 14.

Referring to FIGS. 1 and 4, lift unit 27 for the tailwheel assembly 14 comprises an upright channel 82 secured to the end of beam 26. Projected rearwardly from channel 82 are a pair of spaced parallel links 83 and 84 pivotally connected to an upright channel 86. Transverse pivot pins 87, 88, 89 and 91 pivotally connect opposite ends of links 83 and 84 to the channels 82 and 86 respectively.

Secured to the back of channel 86 is an upright sleeve 92 carrying a shaft 93. The lower end of the shaft projects downwardly and inwardly forming an axle for tailwheel 94. The shaft 93 and wheel 94 comprise the steerable caster wheel of the tailwheel assembly 14. Secured to the upper end of shaft 93 is a lateral crank arm 96 carrying a clevice 97 pivotally connected to the arm by an upright pin 98. The clevice 97 is secured to the rear end of steering rod 81. Collars 99 and 101 mounted on shaft 93 maintain the shaft in vertical alignment with sleeve 92.

An upwardly projected arm 102 is secured to the top of the forward end of link 83. Arm 102 is in longitudinal alignment with a hydraulic cylinder indicated generally at 103. The cylinder is pivotally mounted between upright supports 104 and 106 by transverse pivots 107 secured to opposite sides of the cylinder. A pivot pin 108 connects the piston rod to the upper end of arm 102. Cylinder 103 is connected to the fluid pressure system of the tractor by a line 109 which runs along the frame 12.

Mounted on the forward end of longitudinal beam 26 is a gauge wheel 111. A vertically adjustable standard 112 attached to beam 26 carries wheel 111. As shown in FIG. 4, gauge wheel 111 rides on the ground level adjacent the furrow 113 with the tailwheel 94 riding in the furrow.

Furrow wheel assembly 16 and the lift unit 29 project forwardly from front longitudinal beam 28. This structure is identical to the structure shown in FIG. 4 and comprises a furrow wheel 114 rotatably carried on an upright shaft 115 to form a caster wheel mounted on the forward end of the lift unit 29. The top of shaft 115 does not carry a steering arm. A hydraulic cylinder 116 acting on the links connecting the beam 28 with the caster wheel is joined to the hydraulic system of the tractor by a separate line 117 whereby the front end of the plow frame 12 may be independently raised and lowered by altering the supply of fluid pressure to cylinder 116.

Referring to FIGS. 5 and 6, there is shown the hydraulic holding, release and return mechanism 18 connecting the moldboard plow 17 to the end of the horizontal draft beam 19. Mechanism 18 includes an upwardly and forwardly curved standard 118 connected to the moldboard plow bottom 17 and located between a pair of upright plates 119 and 121. A plurality of transverse nut and bolt assemblies 122 connect the plates to the end of beam 19. The upper end of standard 18 is pivotally connected to a forwardly extended link 123 by transverse pivot pin 124. The forward or opposite end of link 123 is secured to a transverse pivot pin 126 rotatably mounted on suitable sleeve bearings secured to the plates 119 and 121. Located between the plates on opposite sides of standard 118 are rollers 127 and 128 rotatably mounted on transverse pin 129 extended through the standard 118. Rollers 127 and 128 ride on pairs of arcuate tracks 131, 132 and 133, 134 respectively. The tracks secured to the insides of the rear portions of the plates 119 and 121 form upwardly extended arcuate guideways 136 and 137 for the rollers 127 and 128. The center radii of the guideways lies along the transverse axis of the pivot pin 126 so that the guideways along with the link 123 control the movement of the plow bottom 17 in such a manner that when the point of the plow share strikes an obstruction it will raise out of the ground without going below the normal plowing depth or the bottom of the furrow. Mounted on the plates 119 and 121 at the bottom of the guideways 136 and 137 is a stop 138 which engages the standard 118 when the plow bottom is in the normal ground-working position. Stop 138 is an eccentric member which is adjustable to change the ground working angle of the plow bottom.

Secured to the top end of standard 118 is an upright arm 139 aligned with a hydraulic cylinder 141 carrying a piston rod 142. A bifurcated member 143 secured to the outer end of piston rod 142 carries a transverse pin 144 pivotally connecting the upper end of arm 139 to the piston rod 142. Cylinder 141 is located between a pair of upright supports 146 and 147 secured to the top of main beam 22. Secured to opposite sides of the rod end of cylinder 141 are outwardly directed pins 148 projected through suitable holes in the upper ends of supports 146 and 147 to pivotally mount the cylinder on the supports. A hydraulic line 149, as a flexible hose, is connected to the forward end of cylinder 141 and a header line 151 coupled to a pair of accumulaters 152 used to maintain a substantially even pressure on the fluid in the lines 149 and 151 and the cylinder 141. Header line 151 is also coupled by suitable lines to the other cylinders of the hydraulic holding, release and return mechanisms used to bias the remaining plow bottoms in the plow-working positions.

As shown in FIG. 1, a connecter 153 leads from the accumulaters 152. This line is adapted to be connected to the hydraulic system of the tractor so that the hydraulic system of the tractor can be used to replenish the pressure in the fluid system of the plow. Alternatively, the hydraulic system of the tractor can be used to provide a source of hydraulic pressure for the hydraulic holding, release and return mechanisms 18 for the plow bottoms 17.

Referring to FIG. 6, there is shown colter 20 and the hydraulic holding and release mechanism 21 for yieldably holding the colter in the ground-working position forwardly of plow bottom 17. Colter 20 comprises a vertical disc 154 rotatably mounted on a transverse axle 156 carried on an upwardly directed arm 157. The forward end of arm 157 is attached to an upright sleeve 159 rotatably carried on an adjustable offset leg 161. The upper end of leg 161 is secured to the rearwardly directed leg of an L-shaped crank or movable member 162 by a clamp 163. A transverse pivot pin 164 pivotally mounts the apex portion of crank 162 to a downwardly projected bracket 166 secured to the side of beam 19. A stop 167 located forwardly of the upright arm of crank 162 limits the pivotal movement of crank 162 to determine the ground-working position of colter 154. Stop 167 is an adjustable eccentric for changing the working depth of the colter disc 154.

A hydraulic cylinder 168 carrying a piston rod 169 is located adjacent the upright arm of crank 162. The outer end of piston rod 169 is pivotally attached by a pivot pin 171 to upright arm of crank 162. The opposite end of cylinder 168 is located between a pair of upright supports 172. A transverse pivot pin 173 connects the cylinder 168 to the supports 172. A line 174, as a flexible hose, connects the head end of cylinder 168 to the line 149 so that when hydraulic fluid under pressure is supplied to the cylinder 141, cylinder 168 is also supplied with fluid under pressure. When fluid under pressure is supplied to cylinder 168, piston rod 169 biases the upright arm of crank 162 in engagement with the stop 167 thereby holding the colter disc 154 in the ground-working position.

On operation, the plow is lowered into the ground-working position by allowing fluid to escape from the cylinders 103 and 116 together with the lowering of the draft links 11. This lowers the frame 12 moving the plow bottoms 17 in the ground-working positions. The tailwheel assembly 14, the furrow wheel assembly 16, and the draft links 11 may be independently moved to sequentially move the plow bottoms into ground-working position as well as providing the plow frame with proper leveling.

On application of fluid pressure to the cylinders 141 and 168 of each of the hydraulic holding release and return mechanisms 18 and 21 associated with each plow bottom and colter will force and hold the plow bottoms and colters in ground-working positions. The cylinder 141 holds the standard 118 in engagement with the stop 138. In similar manner cylinder 168 holds the crank 162 in engagement with the stop 167. Thus, the cylinders 141 and 168 concurrently hold both the plow bottom 17 and colter 20 in the ground-working position through the use of a common source of fluid pressure. The cylinder 168 for the colter can be coupled to an independent source of fluid under pressure and used with plows which do not have a hydraulic trip for the plow bottoms.

When the colter disc 154 engages an obstruction, as a rock, it will pivot upwardly against the pressure of the fluid in the cylinder 141 over the obstruction. In a similar manner, plow bottom 17 striking an obstruction will move upwardly and rearwardly without going below the plow depth to clear the obstruction. The rollers 127 and 128 ride in the guideways formed by the upright curve tracks while the link 123 pivots upwardly about the pivot pin 126. The fluid pressure in the cylinder 141 provides a yielding force which will return the plow bottom 17 and colter 20 back to the ground-working positions after the obstructions are cleared. This is accomplished without stopping the forward motion of the plow or placing extreme lifting forces on the plow frame.

While there have been shown and described a preferred embodiment of the plow of the invention, it is to be understood that various changes in the details of the hitch, the frame, the supporting wheels for the frame, the colter, and the hydraulic holding, release and return mechanisms for the plow bottoms and colters may be made by those skilled in the art without departing from the spirit of the invention. The term earth-working implement includes but is not limited to a moldboard plow, a digger, a stubble plow, a middle buster, a cultivator, a harrow, a disc plow and like implements. The invention is defined in the following claims.

1. In combination: a generally horizontal frame located above the ground, an earth-working tool, first movable means connecting the tool to the frame, a colter disc forwardly of the earth-working tool, second movable means connecting the colter disc to the frame, said second movable means including arm means pivotally connected to the frame for movement about a generally horizontal transverse axis whereby the colter disc can move in up and down directions, first fluid pressure means connected to the first movable means for holding the earth-working tool in a ground-working position, second fluid pressure means connected to the arm means for holding the colter in a ground-working position, and means connecting the first fluid pressure means and the second fluid pressure means to a common source of fluid under pressure whereby both the earth-working tool and colter disc are held in ground-working positions with comparable amounts of force.

2. The structure of claim 1 wherein the first movable means and the first fluid pressure means comprises a hydraulic holding and release mechanism having an upright standard secured to the earth-working tool, a frame positioned adjacent the standard, a stop engageable with the standard, a link pivotally connected to an upper portion of the standard, upright coacting guide means on the frame and standard cooperating with the link to control the movement of the earth-working tool, and a piston and cylinder unit for forcing and holding the standard in engagement with the stop.

3. The structure of claim 2 wherein the upright coacting guide means comprises arcuate track and rollers for directing the upward movement of the earth-working tool when the tool strikes an obstruction.

4. The structure of claim 2 including a beam, upright support means mounted on the beam, and pivot means rotatably mounting the piston and cylinder unit on the upright support means.

5. The structure of claim 1 wherein the second fluid pressure means comprises a piston and cylinder unit connected to the arm means for holding the colter disc in the ground-working position.

6. The structure of claim 5 including a stop engageable with the arm means, said stop being adjustable to vary the earth-working depth of the colter disc, said piston and cylinder unit operable to hold the arm means in engagement with the stop thereby holding the colter disc in its ground-working position.

7. The structure of claim 6 wherein the arm means is a generally right-angle crank arm.

* * * * *